United States Patent [19]

Porter, Jr.

[11] Patent Number: 4,719,132

[45] Date of Patent: Jan. 12, 1988

[54] PROCESS FOR THE PREPARATION OF MULTI-LAYERED COATINGS AND COATED ARTICLES DERIVED THEREFROM

[75] Inventor: Samuel Porter, Jr., Natrona Heights, Pa.

[73] Assignee: PPG Industries, Inc., Pittsburgh, Pa.

[21] Appl. No.: 45,704

[22] Filed: Apr. 29, 1987

Related U.S. Application Data

[63] Continuation of Ser. No. 653,735, Sep. 21, 1984, abandoned.

[51] Int. Cl.$^4$ .................... B05D 3/02; B32B 15/04
[52] U.S. Cl. .................. 427/409; 427/407.1; 428/423.1; 428/425.8; 428/457
[58] Field of Search ............ 427/407.1, 409, 393.5; 428/423.1, 425.8, 487

[56] References Cited

U.S. PATENT DOCUMENTS

| | | | |
|---|---|---|---|
| 3,479,310 | 11/1969 | Dieterich et al. | 528/71 |
| 3,639,147 | 2/1972 | Benefiel et al. | 117/73 |
| 4,115,472 | 9/1978 | Porter, Jr. et al. | 260/836 |
| 4,147,679 | 4/1979 | Scriven et al. | 260/29.2 TN |
| 4,147,688 | 4/1979 | Makhlouf et al. | 260/33.6 EP |
| 4,220,679 | 9/1980 | Backhouse | 427/401 |
| 4,290,932 | 9/1981 | Wright et al. | 260/29.6 WB |
| 4,315,053 | 2/1982 | Poth et al. | 427/409 X |
| 4,369,225 | 1/1983 | Manabe et al. | 427/409 X |
| 4,403,003 | 9/1983 | Backhouse | 427/407.1 |
| 4,410,668 | 10/1983 | Piccirilli et al. | 525/440 |
| 4,489,135 | 12/1984 | Drexler et al. | 428/423.1 |
| 4,521,489 | 6/1985 | Rehfuss et al. | 428/412 |
| 4,524,192 | 6/1985 | Alexander | 525/440 |
| 4,529,632 | 7/1985 | Fujii et al. | 427/409 |
| 4,533,703 | 8/1985 | Kordomenos et al. | 427/409 X |

FOREIGN PATENT DOCUMENTS 11703-83 9/1983 Australia .
967051 8/1964 United Kingdom .

Primary Examiner—Thurman K. Page
Attorney, Agent, or Firm—William J. Uhl

[57] ABSTRACT

A process for producing multi-layered coated articles is disclosed. The process comprises applying a pigment containing aqueous polyurethane film-forming composition to a substrate to form a basecoat followed by the application of a transparent topcoat to the basecoat.

22 Claims, No Drawings

PROCESS FOR THE PREPARATION OF MULTI-LAYERED COATINGS AND COATED ARTICLES DERIVED THEREFROM

This application is a continuation of application Ser. No. 653,735, filed Sept. 21, 1984 now abandoned.

BACKGROUND OF THE INVENTION

1. Field of the Invention

The present invention relates to a process for preparing multi-layered coated articles and to the coated articles themselves. More particularly, the invention relates to a process for preparing a multi-layered coating comprising a basecoat and a topcoat in which the basecoat is aqueous-based and contains color pigments, and the topcoat is transparent.

2. Brief Description of the Prior Art

Metallic coatings are becoming increasingly popular, particularly for use in automobiles. These coatings contain a metallic pigment such as aluminum flake along with a polymeric binder. The coatings have a very lustrous appearance which can be enhanced by topcoating the metallic coating with a clear topcoat which is often organic solvent based. This system is commonly referred to as "clear-over-color" or "color plus clear".

In developing the clear-over-color systems in which the color coat contains metallic pigments, it has been found desirable to incorporate an additive in the basecoat composition which will help orient the metallic pigment such that it is parallel to the coated surface. Alignment in this fashion provides for the most pleasing appearance particularly with regard to "flop". By "flop" is meant the visual change in brightness or lightness of a metallic coating with the change in viewing angle, that is, a change from 90 through 180 degrees. The greater the change, that is, from a light to dark appearance, the better the flop. Flop is important because it accentuates the lines and curves of an automobile.

The additive also enables the basecoat to set or dry quickly so that an organic solvent base topcoat composition can be applied without the solvents in the topcoat attacking the basecoat, i.e., topcoat "striking in" to the basecoat. This "striking in" adversely affects alignment of the metallic pigment and the gloss of the topcoat. Although the basecoat could be first cured by heating before application of the topcoat, this is not favored by coatings users, particularly the automotive industry, who wish to apply the topcoat to the basecoat via a "wet-on-wet" application followed by a single heating step to cure the composite coating. Examples of suitable additives for incorporation into the basecoat are cellulose acetate butyrate and crosslinked polymeric microparticles (microgel) which are described in U.S. Pat. Nos. 3,639,147 and 4,220,679, respectively.

It has also been found in developing this invention that with regard to the appearance of metallic coatings, water-based basecoats provide for the brightest coating and the best flop. Color plus clear systems using water-based basecoats are described in U.S. Pat. No. 4,403,003. However, this reference discloses the use of microgel in the basecoat and this can pose a disadvantage. One of the most popular microgels are those described in U.S. Pat. No. 4,147,688. However, these microgels are prepared in organic solvent and are difficult to incorporate into a water-based system. Although there are microgels which are prepared in aqueous systems such as those described in British Patent No. 967,051 and U.S. Pat. No. 4,290,932, these aqueous-based microgels are difficult to prepare in high yields and can present stability problems when incorporated into paints.

Surprisingly, it has been found that certain water-dilutable polymeric binders can be used in the formulation of metallic pigment-containing basecoats which do not require the presence of crosslinked polymeric microparticles or cellulose acetate butyrate. Transparent topcoats can be applied to these basecoats via a wet-on-wet technique to provide for lustrous multi-layered coated articles with excellent flop. The invention is also applicable to basecoats without metallic pigmentation but with color pigments. The water-dilutable polymeric binders can be applied over both metallic portions and elastomeric portions of a substrate such as are commonly found on motor vehicle bodies thereby providing a universal basecoat. Also in a preferred embodiment of the invention, specific topcoats can be applied to the basecoat over both elastomeric and metallic parts providing a universal color plus clear coating system. Such universal coating system is particularly desirable in the automotive industry where the metallic parts of the motor vehicle are painted with one type of paint and the elastomeric parts such as bumpers and front end facia are painted with another type of paint which has to be more flexible than the paint for the metallic parts. The use of two types of paints is labor intensive and presents problems with color matching. The universal coatings of the present invention overcome these disadvantages.

SUMMARY OF THE INVENTION

In accordance with the present invention, a process for applying a composite coating to a substrate is disclosed. The process comprises:
(1) applying to the surface of the substrate an aqueous-based film-forming composition containing color pigments, preferably metallic pigments, and a water-dilutable polyurethane binder,
(2) forming a basecoat on the surface of the substrate from the composition applied from step 1,
(3) applying to the basecoat a film-forming composition, and
(4) forming a transparent topcoat from the composition applied in step 3 over the basecoat.

The invention also provides for articles prepared in accordance with the process described above.

DETAILED DESCRIPTION

The aqueous-based film-forming compositions of the present invention comprise as an essential ingredient a water-dilutable polyurethane binder. The polyurethane can be prepared by reacting an organic polyisocyanate with an active hydrogen-containing material such as a polyol and/or a polyamine to form a polyurethane, polyurea or mixed poly(urethane-urea). In the present invention where the expression "polyurethane" is used, not only polyurethanes from the reaction of polyisocyanates and polyols is intended but also mixed poly(urethane-ureas) and polyureas are intended. Also, reaction products obtained from the reaction of polyisothiocyanates with active hydrogen-containing compounds are intended.

To achieve the best blend of properties in the coating, that is, flexibility and adhesiveness, the organic polyisocyanate is reacted with a polymeric active hydrogen-containing compound and preferably with a short chain active hydrogen-containing compound.

The organic polyisocyanate which is used can be an aliphatic including cycloaliphatic or aromatic polyisocyanate or a mixture of the two. Diisocyanates are preferred although higher polyisocyanates can be used in place of or in combination with diisocyanates. Examples of suitable polyisocyanates are 4,4'-diphenylmethane diisocyanate, toluene diisocyanate, 1,6-hexamethylene diisocyanate, isophorone diisocyanate, 4,4'-methylene-bis(cyclohexylisocyanate), trimethylhexamethylene diisocyanate and 1,2,4-benzene triisocyanate. Isothiocyanates corresponding to the above-described isocyanates where they exist can be employed as well as mixed compounds containing both isocyanate and isothiocyanate groups.

The preferred active hydrogen-containing materials which are reacted with polyisocyanate would include materials such as amines, amino alcohols, mercapto-terminated derivatives and polyols which are preferred. The term "active hydrogen" refers to hydrogens which, because of their position in the molecule, display reactivity according to the Zerewitinoff test. Preferred active hydrogens include hydrogen atoms attached to oxygen, nitrogen or sulfur and thus useful compounds include those having at least two of the groups hydroxyl, thiol, primary and secondary amines.

For the development of good flexibility and adhesiveness, the active hydrogen-containing material is preferably a mixture of both the high and low molecular weight active hydrogen-containing material. Examples of suitable low molecular weight active hydrogen-containing materials are diols, triols, diamines and triamines having a molecular weight less than 300 and usually in the range of about 60 to 250. Such materials include aliphatic polyols, particularly alkylene polyols containing from 2 to 18 carbon atoms such as ethylene glycol, 1,4-butanediol, neopentyl glycol and trimethylolpropane. Polyols containing acid groups such as dimethylolpropionic acid can be used as can polyamines such as ethylenediamine and hydrazine. Mixtures of low molecular weight active hydrogen-containing materials can be used.

Examples of high molecular weight active hydrogen-containing materials are polymeric polyols which have molecular weights of at least 400 and usually within the range of about 400 to 3000. The most suitable polymeric polyols include polyether polyols such as linear polyether diols, polyester polyols including polyhydroxy polyesteramides, and hydroxyl-containing polycaprolactones and hydroxyl-containing acrylic interpolymers including mixtures of polymeric polyols. Polyester polyols such as linear polyester diols including hydroxy-containing polycaprolactones, particularly diols, are preferred.

Examples of polyether polyols are polyalkylene ether polyols which have the following structural formula:

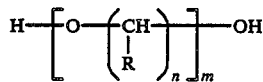

where the substituent R is hydrogen or lower alkyl including mixed substituents and n is typically from 2 to 6 and m is from 2 to 100 or higher. Examples are poly(oxytetramethylene) glycols and poly(oxyethylene) glycols.

Examples of polyester polyols are those prepared by polyesterification of organic polycarboxylic acids or anhydrides thereof with organic polyols. Polyols used in preparing the polyester include alkylene glycols such as ethylene glycol, 1,4-butanediol, neopentyl glycol and trimethylolpropane including mixtures thereof.

The acid component of the polyester consists primarily of monomeric carboxylic acids or anhydrides having about 2 to 36 carbon atoms per molecule. The acid may be acyclic or cyclic including cycloaliphatic and aromatic polycarboxylic acids. Among the acids which can be used are phthalic acid, tetrahydrophthalic acid, hexahydrophthalic acid, adipic acid, dimeryl diacid and maleic acid including mixtures of acids. Where acids are referred to above, it is understood that anhydrides of those acids which form anhydrides can be used in place of the acid. Also, lower alkyl esters of acids such as dimethyl esters can be used.

Besides polyester polyols prepared from polybasic acids and polyols, polycaprolactone-type polyesters can also be employed. These products are formed from reaction of a cyclic lactone such as epsiloncaprolactone with a polyol such as ethylene glycol, diethylene glycol and dimethylolpropionic acid including mixtures thereof. Such products are described in U.S. Pat. No. 3,169,945 to Hostettler.

Hydroxyl-containing acrylic polymers can also be employed. These products are described in U.S. Pat. No. 3,919,351 to Chang et al in column 2, line 63 to column 3, line 60, the portions of which are hereby incorporated by reference.

Preferably, the relative amounts of organic polyisocyanate and active hydrogen-containing compound which are reacted with one another are such that the resulting polymer will have a urethane content greater than 6, preferably at least 8, more preferably about 8 to 25 percent by weight; the percentage by weight being based on weight of urethane linkage per total weight of polymer. By urethane is meant to include not only the reaction of isocyanate and hydroxy, i.e.,

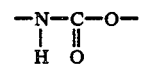

but also includes reaction of isocyanate and other active hydrogens such as primary and secondary amino and thiol.

With regard to the active hydrogen-containing materials which are used in preparing the polyurethane, preferably the high molecular weight active hydrogen-containing material is present in amounts of about 50 to 95, more preferably 60 to 85 percent by weight, based on total weight of active hydrogen-containing material with the remainder being the low molecular weight active hydrogen-containing material.

The organic polyisocyanate and active hydrogen-containing material can be reacted at temperatures of from about 20° to 200° C. for about 0.1 to 4 hours and optionally in the presence of a catalyst such as an organo tin compound. The reactants and solvents used in the reaction preferably are dry. Polyurethanes can be prepared via so-called one-shot technique in which all the active hydrogen-containing materials are reacted with the organic polyisocyanate or preferably by the prepolymer method in which only part of the active hydrogen-containing materials are reacted to form an NCO-prepolymer followed by reacting the prepolymer with the remaining portion of active hydrogen-containing materials.

The polyurethanes for use in the practice of the invention are water dilutable, that is, they can be dispersed in water and, as resinous binders in the invention, are aqueous polyurethane dispersions. Dispersion can be obtained by thinning the polyurethanes in a water-miscible solvent and dispersing the diluted polyurethanes with water, optionally in the presence of an externally added surfactant. Preferably, however, the polyurethanes are prepared so that they contain ionic salt groups in the polymer backbone. Such ionically charged polymers can be dispersed more readily in water and form more stable dispersions. Examples of ionic groups are anionic salt groups selected from the class consisting of $-OSO_3^-$, $-OPO_3^=$, $-COO^-$, $-SO_2O^\ominus$, $-POO^-$ and $PO_3^=$ with $COO^-$ being preferred. The polyurethane can be prepared with reactants containing an acid group which can be subsequently neutralized before, after or during polyurethane formation. Suitable materials for introducing acid groups into the polyurethane are compounds which have two groups which are reactive towards isocyanate groups and at least one group which is capable of forming an anion. Examples of such compounds are hydroxy and mercapto carboxylic acids. Specific examples include dimethylolpropionic acid, which is preferred, glycolic acid and lactic acid. Other examples of compounds which contain active hydrogens and acid groups are amino carboxylic acids, amino hydroxy carboxylic acids, sulfonic acids, hydroxy sulfonic acids and amino sulfonic acids. Examples include oxaluric acid, anilido acetic acid, glycine, 6-amino-caprylic acid, reaction product of ethanolamine and acrylic acid, hydroxyethylpropionic acid, 2-hydroxyethane sulfonic acid and sulphanilic acid. Amino acids must be used in the presence of base such as potassium hydroxide or a tertiary amine. Other examples include bis-hydroxymethyl-phosphinic acid, trimethylolpropane monophosphate and monosulfate. Suitable salt-forming agents for acid group-containing compounds include inorganic and organic bases such as sodium hydroxide, potassium hydroxide, ammonia and tertiary amines.

Besides anionic salt groups which are preferred, the polyurethane can contain cationic salt groups such as those selected from the class consisting of

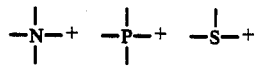

including mixed groups.

Preparation of polyurethanes with cationic groups are described in U.S. Pat. No. 4,147,679, column 12, line 12, to column 13, line 30, the portions of which are herein incorporated by reference.

Besides using ionic solubilizing groups as described above, non-ionic solubilizing groups can be incorporated into the polymer. The non-ionic water-solubilizing groups can be incorporated into the polymer through the isocyanate or through the active hydrogen component of the polyurethane. Examples of non-ionic water-solubilizing groups are ethylene oxide moieties which should constitute not more than 50 percent by weight of the prepolymer and which can be incorporated into the prepolymer using polyethylene glycols.

The polyurethanes can be prepared as described above and dispersed directly in water. Examples of preparing the polyurethanes by this technique are shown in U.S. Pat. No. 3,479,310 to Dieterich et al. Also, water-based polyurethanes can be prepared in accordance with Examples 6 and 7 of U.S. Pat. No. 3,954,899.

Preferably, the polyurethanes are prepared by first preparing an intermediate reaction product, an NCO-containing prepolymer which is converted into a predominant aqueous phase by dispersing the prepolymer in water and reacting the NCO groups which are still present with active hydrogen-containing materials having at least two active hydrogens more reactive with NCO groups than water. Examples of suitable chain extenders are polyamines such as diamines having primary and/or secondary amine group, including hydrazine, substituted hydrazine and hydrazine reaction products. Specific examples of suitable chain extenders include ethylenediamine, hexamethylenediamine, and hydrazine. Examples of preparing prepolymers by this technique are described in U.S. Pat. No. 4,147,679.

The water-dilutable polyurethane binder is preferably of high molecular weight but yet well dispersed in the aqueous medium. A measurement of the molecular weight is the intrinsic viscosity of the polyurethane.

The intrinsic viscosity of various resins are determined by artrecognized methods. Thus, the intrinsic viscosity of the resins of the present invention may be determined by removing the aqueous solvent either by evaporation or decantation. The resin solid is then dissolved in N-methyl pyrrolidone or other suitable solvent at a concentration of from 8 to 30 percent. This solution is further thinned with dimethyl formamide to 0.5 percent and 0.25 percent concentrations. The resins may then be passed through a capillary viscometer to determine the reduced viscosities.

The intrinsic viscosity of the resin will then be determined by the following equation:

$$[\mu] = [\mu \text{ reduced}]_{C=O} = [\mu \text{ reduced}]_{0.25} + [[\mu \text{ reduced}]_{0.25} - [\mu \text{ reduced}]_{0.50}] = 2[\mu \text{ reduced}]_{0.25} - [\mu \text{ reduced}]_{0.50}$$

where $[\mu]$ is intrinsic viscosity and $[\mu \text{ reduced}]_{0.25}$ is the reduced viscosity of 0.25 percent concentration and $[\mu \text{ reduced}]_{0.50}$ is the reduced viscosity of 0.50 percent concentration. The general methods of determining reduced viscosities are described in the art such as TEXTBOOK OF POLYMER SCIENCE, Billmeyer, Interscience Publishers, New York, 1962, pages 79–81.

The polyurethane polymers of the present invention preferably have intrinsic viscosities of at least 0.1 deciliters per gram, although preferably lower than 4.0 deciliters per gram, and more preferably lower than 2.0 deciliters per gram, and most preferably within the range of 0.1 to 1.5 deciliters per gram; the intrinsic viscosities being determined for anionic polymers on the acid form of the polymer; for non-quaternized cationic polymers on the basic form of the polymer; and for quaternized polymers on the ionic form of the prepolymer itself.

High molecular weight polyurethanes are preferred because they provide for optimum metallic pigment orientation, and prevent strike in of the topcoats without the need for special additives. Also, high molecular weight polyurethanes provide for optimum adhesiveness and flexibility in the coating making the coating useful for both elastomeric and metallic parts in the substrate, i.e., a universal basecoat. Preferably for use as a universal coating, a free film of the polyurethane will have a tensile strength of greater than 2000 and usually within the range of 2,500 to 10,000 psi and elongations of at least 40 and more preferably from 75 to 200 percent as determined according to ASTM D-639-72.

Besides the polyurethane, the binder of the basecoat composition may also contain other resinous ingredients such as aminoplast such as a water-dilutable melamine resin. Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates of diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfuryl may be used.

The aminoplast contains methylol or similar alkylol groups and preferably at least a portion of these alkylol groups are etherified by reaction with an alcohol to provide organic solvent-soluble resins. Any monohydric alcohol can be employed for this purpose including such alcohols as methanol, ethanol, butanol and hexanol.

Preferably, the aminoplasts which are used are melamine-, urea- or benzoguanamine-formaldehyde condensates etherified with an alcohol containing 1 to 4 carbon atoms such as methanol, ethanol, butanol or mixtures thereof. When used in the basecoat composition, the aminoplast is present in amounts of about 1 to 80, usually 20 to 60 percent by weight based on weight of polyurethane and aminoplast.

The basecoat composition also contains color pigments. Compositions containing metallic flake pigmentation are useful for the production of so-called "glamour metallic" finishes chiefly upon the surface of automobile bodies. Proper orientation of the metallic pigments results in a lustrous shiny appearance with excellent flop, distinctness of image and high gloss. By flop is meant the visual change in brightness or lightness of a metallic coating with a change in viewing angle, that is, a change from 90 to 180 degrees. The greater the change, that is, from a light to dark appearance, the better the flop. Flop is important because it accentuates the lines of a curved surface such as an automobile body. Suitable metallic pigments include, in particular, aluminum flake, copper bronze flake and mica.

Besides the metallic pigments, the base coating compositions of the present invention may contain non-metallic color pigments conventionally used in surface coating compositions including inorganic pigments such as titanium dioxide, iron oxide, chromium oxide, lead chromate and carbon black, and organic pigments such as phthalocyanine blue and phthalocyanine green.

In general, the pigment is incorporated into the coating composition in amounts of about 1 to 80 percent by weight based on weight of coating solids. The metallic pigmentation is employed in amounts of about 0.5 to 25 percent by weight of the aforesaid aggregate weight.

If desired, the basecoat composition may additionally contain other materials well known in the art of formulating surface coatings. These would include surfactants, flow control agents, thixotroping agents, fillers, anti-gassing agents, organic co-solvents, catalysts and other customary auxiliaries.

The basecoating compositions of the present invention can be applied to various substrates to which they adhere. The compositions can be applied by conventional means including brushing, dipping, flow coating, spraying and the like, but they are most often applied by spraying. The usual spray techniques and equipment for air spraying and electrostatic spraying are utilized. Coatings of the present invention can be applied over virtually any substrate including wood, metals, glass, cloth, plastic, foam, including elastomeric substrates and the like. They are particularly useful in applying over both metal and elastomeric substrates, and as mentioned above, can be applied over both metallic and elastomeric parts of the substrate such as are found on motor vehicles.

During application of the basecoat composition to the substrate, a film of the basecoat is formed on the substrate. Typically, the basecoat thickness will be about 0.1 to 2, preferably 0.1 to 1.5 mil.

After application to the substrate of the basecoat composition, a film is formed on the surface of the substrate. This is achieved by driving water out of the basecoat film by heating or simply by an air drying period. Preferably, the heating step will only be sufficient and for a short period of time to insure that the topcoat composition can be applied to the basecoat without any tendency of the former to mix or dissolve the basecoat composition, i.e., "striking in". Suitable drying conditions will depend on the ambient humidity but in general a drying time of from about 1 to 5 minutes at a temperature of about 80° to 175° F. (27° to 79° C.) will be adequate to insure that mixing of the two coats is prevented. At the same time, the basecoat film is adequately wetted by the topcoat composition so that satisfactory intercoat adhesion is obtained. Also, more than one basecoat and multiple topcoats may be applied to develop the optimum appearance. Usually, between coats, the previously applied basecoat or topcoat is flashed, that is, exposed to ambient conditions, for about 1 to 20 minutes.

The topcoat compositions can be applied to the substrate by any of the conventional techniques such as brushing, spraying, dipping or flowing, but it is preferred that spray application be used since this gives the best gloss. Any of the known spray compositions may be adopted such as compressed air spraying, electrostatic spraying and either manual or automatic methods are suitable.

After application of the topcoat composition to the basecoat, the coated substrate may be subjected to a heating to conjointly harden the coating layers. In the curing operation, solvents are driven off and the film-forming material of the topcoat and/or that of the basecoat is crosslinked with the aid of any crosslinking agents present. The heating or curing operation is usually carried out at a temperature in the range of from 160° to 350° F. (71° to 177° C.) but, if needed, lower or higher temperature may be used depending upon whether it is sufficient to activate any necessary crosslinking mechanism. In certain instances, air drying may be acceptable.

The thickness of the topcoat is usually from about 1 to 5, preferably 1.2 to 3 mils.

The topcoating composition comprises a film-forming polymer and usually a diluent. There may be used any suitable film-forming polymer. The polymer may be either thermoplastic or thermosetting in nature. The polymer may be of an acrylic type which is particularly useful for automotive finishes. These are polymers or copolymers of one or more alkyl esters of acrylic or methacrylic acid, optionally together with other ethylenically unsaturated monomers. Suitable acrylic esters include methyl methacrylate, butyl methacrylate and 2-ethylhexylacrylate. Suitable other copolymerizable monomers include styrene and acrylonitrile. Where the acrylic polymer is of the thermosetting type, there should be present suitable functional monomers which can result in crosslinking. Examples would include hydroxyl-containing acrylic monomers such as hydroxyethyl methacrylate and hydroxypropyl methacrylate and acidcontaining acrylic monomers such as acrylic acid and methacrylic acid. These materials can be crosslinked with a curing agent such as an aminoplast condensate or a polyisocyanate. Examples of suitable aminoplasts are those described above.

Polyisocyanates and blocked polyisocyanates can also be used as curing agents. Examples of suitable polyisocyanates include monomeric polyisocyanates such as toluene diisocyanate and 4,4'-methylene-bis(cyclohexyl isocyanate), isophorone diisocyanate and NCO-prepolymers such as the reaction products of monomeric polyisocyanate such as those mentioned above with polyester or polyether polyols. Useful isocyanates are the isocyanurate from isophorone isocyanate commercially available from Veba Company as T1890 and the isocyanurate from 1,6-hexamethylene diisocyanate commercially available from Mobay Chemical Company as KL 52444. The polyisocyanate may optionally be blocked. Examples of suitable blocking agents are those materials which would unblock at elevated temperatures such as lower aliphatic alcohols such as methanol, oximes such as methyl ethyl ketoxime, and lactams such as caprolactam. Blocked isocyanates can be used to form stable one-package systems. Polyfunctional isocyanates with free isocyanate groups can be used to form two-package room temperature curable systems.

Besides the acrylic polymers, polyesters can also be used in the formulation of the topcoat. Usually, these polyesters are polyester polyols which are designed to be cured with a polyisocyanate or with an aminoplast resin as mentioned above. The polyesters are formed by the polyesterification of an organic polycarboxylic acid or its functional equivalent thereof with an organic polyol. Among the acids which can be used are phthalic acid, terephthalic acid, tetrahydrophthalic acid, hexahydrophthalic acid, azelaic acid and dimerized fatty acid including mixtures. Examples of suitable polyols are ethylene glycol, 1,4-butanediol, neopentyl glycol, trimethylpentanediol and trimethylolpropane including mixtures. Also, polycaprolactone-type polyesters may be employed which are formed from reaction of a cyclic lactone such as epsilon-caprolactone with a polyol or a hydroxy acid such as ethylene glycol and dimethylolpropionic acid.

Polyurethanes may also be used as the film-forming polymer in the topcoat composition. Particularly suitable are poly(ester-urethane) polyols which can be cured with an aminoplast or polyisocyanate as described above. The polyester polyol is usually first prepared and then reacted with the polyisocyanate. Among the polyesters which may be used are those mentioned above. The polyisocyanate can be aromatic, aliphatic and cycloaliphatic with aliphatic and cycloaliphatic being preferred because of their better U.V. light stability. Examples of polyisocyanates are toluene diisocyanate, 1,6-hexamethylene diisocyanate and isophorone diisocyanate. The polyurethane-based coating compositions are preferred because they can be applied to the basecoat over both the metallic and elastomeric parts of a substrate, i.e., universal clear coat. Examples of such polyurethane-based coating compositions are described in U.S. patent application Ser. Nos. 538,630 and 538,631, both to Chang et al, filed Oct. 3, 1983, which are hereby incorporated by reference.

To be useful as a universal clear coat, the topcoat composition, when applied over the basecoat, should be flexible, yet somewhat hard and durable.

The flexibility of the coatings can be determined by coating an elastomeric substrate such as ⅛-inch thick thermoplastic polyurethane commercially available from Mobay Company as TEXIN 3202 and bending the coated substrate around a ½-inch diameter (1.13 cm) mandrel with the coating side outwardly facing. After bending, the coating is examined for breaks and cracks. Testing can be conducted at room temperature, i.e., 70°–75° F., or at low temperature, i.e., cooling substrate to 0° F. before bending. When formulated for automotive use on elastomeric parts, the coatings of the present invention preferably exhibit no breaks or cracks when tested at 32° F. in the above-described manner, and more preferably exhibit no breaks or cracks when tested at 0° F.

The hardness of the coatings can be determined by the Sward method using a Sward rocker as described in ORGANIC COATINGS TECHNOLOGY, Payne, Vol. 1, 1965, pages 642–643. Cured coatings of the present invention preferably have a Sward hardness within the range of 10 to 40, more preferably 14 to 40. Testing for Sward hardness is done on coatings having a thickness of about 2 to 3 mils over steel panels.

The durability of the coating can be determined by exposing the coated substrates in Florida. The gloss of the substrate is measured immediately prior to testing and then after 3 months, 6 months and 9 months exposure. Accordingly, with coating compositions of the present invention properly formulated for outdoor exposure with U.V. light stabilizers, anti-oxidants, etc., the loss of gloss preferably is no more than about 10 percent of the initial value after exposure for 3 months, no more than 20 percent after 6 months, and no more than 40 percent after 9 months.

A particularly preferred topcoat composition is a two-package system based on a polyurethane polyol and a polyisocyanate curing agent. The compositions give a topcoat which is particularly smooth giving a very glamorous appearance looking as if the substrate has just been wetted, i.e., the wet look. Examples of two-pack polyurethane polyol/polyisocyanate systems are described in the afore-mentioned U.S. patent application Ser. No. 538,630 to Chang et al.

The topcoat composition is preferably organic solvent-base and of the high solids type. Alternately, the topcoat composition may, like the basecoat composition, be water-base. In fact, both the color basecoat and the transparent topcoat can be formulated with the same water-dilutable polyurethane binder. Examples of suitable organic solvents are aromatic polymers such as toluene and xylene, esters such as 2-ethoxyethylacetate, ketones such as methyl amyl ketone and alcohols such as n-butanol, and glycol monoethers such as 2-ethoxyethanol, 2-hexoxyethanol and the monobutyl ether of diethylene glycol.

By high solids is meant the coating composition is sprayable at a resin solids content of at least 35 percent, preferably at least 45 percent, and usually within the range of 37 to 60 percent by weight.

The sprayability is the maximum concentration of the resin solids in solution such that the resin can be atomized sufficiently to form a uniformly deposited coating. Above the maximum concentration, the spraying solution strings and gives a web-like spray pattern. The sprayability of the resin solids is determined by first dissolving the resin in a suitable solvent such as N-methyl pyrrolidone to a viscosity of about 500 to 1000 centipoises measured at 78° F. and then thinning with a mixture of 2 parts methyl ethyl ketone, 2 parts of n-butanol and 1 part of 2-ethoxyethylacetate (all parts by volume) to the maximum spray solids. The sprayability is then determined on the thinned solutions using a spray gun such as an air suction spray gun operating at 60 psi with a No. 30 air cap.

The invention is illustrated but is not limited by the following examples. In these examples and throughout the specification, parts and percentages are by weight unless otherwise indicated.

EXAMPLE A

A water-diluted polyurethane binder was prepared from the following ingredients:

| Ingredients | Parts by Weight (pounds) |
| --- | --- |
| N—methyl 2-pyrrolidone | 432.4 |
| FORMREZ F20-30[1] | 315.0 |
| POLYMEG 2000[2] | 315.0 |
| Dimethylolpropionic acid | 129.0 |
| HYLENE W[3] | 573.0 |
| Neopentyl glycol | 6.5 |
| Deionized water | 2348.0 |
| Dimethylethanolamine | 82.3 |
| Ethylenediamine | 43.7 |

[1]Poly(neopentyl adipate) glycol having a molecular weight of 2000, available from Witco Company.
[2]Polytetramethylene glycol, molecular weight 2000, available from Quaker Oats Company.
[3]4,4'-methylene-bis(cyclohexyl isocyanate) available from E. I. duPont de Nemours and Company.

The N-methyl 2-pyrrolidone, FORMREZ F20-30, POLYMEG 2000, dimethylolpropionic acid and 257 grams of dibutyltin dilaurate and 2858 grams of n-butanol were charged to a clean dry reactor set for total reflux and a nitrogen blanket and heated to 185°–194° F. (85°–90° C.) and held for about 15 minutes until the reaction mixture is homogeneous. The reaction mixture was then cooled to 130°–140° F. (54°–60° C.) and the HYLENE W added followed by the addition of the neopentyl glycol. The temperature of the reaction mixture was adjusted to 158°–167° F. (70°–75° C.) and held for about 15 minutes until the batch became homogeneous. The temperature of the reaction mixture was adjusted to 185°–194° F. (85°–90° C.) and dispersed by adding to a mixture of the deionized water, dimethylethanolamine and ethylenediamine while maintaining temperature of the dispersion between 158°–167° F. (70°–75° C.). The resulting dispersion was stirred for 30 minutes at 158°–167° F. (70°–75° C.) and cooled to 86°–95° F. (30°–35° C.). The dispersion had a solids content of 34.3 percent and a pH of 7.86.

EXAMPLE B

A water-diluted polyurethane was prepared from the following ingredients:

| Ingredients | Parts by Weight (pounds) |
| --- | --- |
| Diethylene glycol | 110.0 |
| Epsilon-caprolactone | 1683.0 |
| Dimethylolpropionic acid | 251.0 |
| N—methyl 2-pyrrolidone | 969.0 |
| DESMODUR W[1] | 1152.0 |
| Neopentyl glycol | 13.5 |
| Dimethylethanolamine | 161.0 |
| Hydrazine | 63.3 |
| Deionized water | 6822.7 |

[1]4,4'-methylene-bis(cyclohexyl isocyanate) available from Mobay Chemical Company.

The diethylene glycol, epsilon-caprolactone and dimethylolpropionic acid were charged to a clean dry reactor set for total reflux and a nitrogen blanket and heated to 220°–230° F. (104°–110° C.) and held for 1 hour. While cooling the reaction mixture to 140°–149° F. (60°–65° C.), the N-methyl 2-pyrrolidone was added and the reaction mixture held at this temperature for 30 minutes. The temperature of the reaction mixture was adjusted to 104°–113° F. (40°–45° C.) and the DESMODUR W added followed by the addition of the neopentyl glycol. Dibutyltin dilaurate (604 grams) was then added and the reaction mixture heated to 140°–145° F. (60°–63° C.) and held until a reduced Gardner Holdt viscosity (20 grams reaction mixture/5 grams 2-butoxyethanol) of 150 seconds was reached. The reaction mixture was then cooled to 121°–130° F. (49°–54° C.) and held until the Gardner-Holdt viscosity reached 200 seconds. The reaction mixture was then dispersed by adding to a mixture of the deionized water, dimethylethanolamine and hydrazine while maintaining the temperature of the dispersion between 140°–149° F. (60°–65° C.) and holding for 30 minutes. The dispersion had a solids content of 28.3 percent and a pH of 8.25.

EXAMPLE C

A water-diluted polyurethane was prepared from the following ingredients:

| Ingredients | Parts by Weight (grams) |
| --- | --- |
| FORMREZ F20-30 | 807 |
| POLYMEG 2000 | 807 |
| Phthalic anhydride | 32.3 |
| N—methyl 2-pyrrolidone | 1090.0 |
| Dimethylolpropionic acid | 296.2 |
| Dibutyltin dilaurate | 1.6 |
| TINUVIN 770[1] | 35.1 |
| HYLENE W | 1411 |
| Neopentyl glycol | 33.3 |
| Deionized water | 2330.0 |
| Dimethylethanolamine | 83.5 |
| Ethylenediamine | 41.7 |

[1]Hindered amine U.V. light absorber from Ciba Geigy.

The FORMREZ F20-30, POLYMEG 2000 and phthalic anhydride were charged to a reactor and heated to 120° C. and held at a temperature of 120°–126° C. for 2 hours. The N-methyl 2-pyrrolidone was added and the reaction mixture cooled to room temperature followed by the addition of the dimethylolpropionic acid, the dibutyltin dilaurate and the TINUVIN 770. The reaction mixture was heated to 90° C., held for 30 minutes at this temperature, cooled to 70° C., followed by the addition of the HYLENE W. The reaction mixture was cooled to 45° C., held for about 2 hours, followed by the addition of the neopentyl glycol. The temperature of the reaction mixture was raised to 90° C. and held for about 2 hours, followed by dispersing the reaction mixture by adding it to a mixture of the deionized water, dimethylethanolamine and ethylenediamine while maintaining the temperature of the dispersion between 70°–75° C. The resulting dispersion had a pH of 8.5.

EXAMPLE D

A hydroxyl-containing acrylic polymer was prepared from the following ingredients:

| Kettle Charge | |
| --- | --- |
| Ingredients | Parts by Weight (grams) |
| Methyl amyl ketone | 1440 |

| Feed A | |
| --- | --- |
| Ingredients | Parts by Weight (grams) |
| Isobutyl methacrylate | 2856 |
| Styrene | 1120 |
| 2-Ethylhexyl acrylate | 840 |
| Hydroxyethyl acrylate | 560 |
| Methacrylic acid | 224 |
| Tertiary-dodecyl mercaptan | 112 |

| Feed B | |
| --- | --- |
| Ingredients | Parts by Weight (grams) |
| Methyl amyl ketone | 840 |
| VAZO-67[1] | 112 |

[1] 2,2'-azobis-(2-methylbutyronitrile) available from E. I. duPont de Nemours and Company.

| Feed D and Feed E (each) | |
| --- | --- |
| Ingredients | Parts by Weight (grams) |
| Methyl amyl ketone | 60 |
| VAZO 67 | 22.5 |

The kettle charge was heated in a reaction vessel equipped for full reflux to initiate a reflux at 148° C. Feeds A and B were then added simultaneously over a period of about 2 hours. At the completion of the addition, Feed D was added and the reaction mixture held for 1 hour at 152° C. followed by the addition of Feed E and holding the reaction temperature at 153° C. for 1½ hours. The resultant acrylic polymer had a solids contents of 69.1, an acid value of 19.1 and a hydroxyl value (theoretical) of 34.1.

EXAMPLE E

A polyester was prepared from trimethylpentanediol and hexahydrophthalic anhydride as follows.

| Ingredients | Parts by Weight (pounds) |
| --- | --- |
| Trimethylpentanediol | 2500.0 |
| Hexahydrophthalic anhydride | 1346.0 |
| Dibutyltin oxide | 7.7 |
| Methyl amyl ketone | 410 |

The ingredients above were charged in the order listed to a reaction vessel equipped for total reflux and a nitrogen blanket. The ingredients were heated to 270° F. (132° C.) over 1 hour and held for 1 hour at this temperature. The temperature was then raised to 340° F. (171° C.) and held for 30 minutes. The reaction mixture began to reflux and reflux was continued at 420° F. (216° C.) until an acid value of 10 was obtained. The resultant reaction product had a solids content of 75.3 percent, an acid value of 8.6 and a hydroxyl value of 204.6.

EXAMPLE F

A polyester-urethane polyol was prepared from reacting isophorone diisocyanate with a polyester diol prepared from dimerized fatty acid. The polyester was prepared from the following ingredients:

| Ingredients | Parts by Weight (grams) |
| --- | --- |
| EMPOL 1010[1] | 2820 |
| Neopentyl glycol | 793.4 |
| Trimethylolpropane | 308 |
| Cyclohexanedimethanol | 836.5 |
| Butyl stannoic acid | 0.95 |
| Triphenyl phosphine | 2.4 |

[1] Dimerized fatty acid available from Emery Chemical Company.

The ingredients above were charged to a reaction vessel equipped for complete reflux and nitrogen sparging. The ingredients were heated to 200° C. under a nitrogen blanket to initiate reflux and the reaction mixture was maintained at reflux until an acid value of about 8.5 was obtained. The reaction mixture had a solids content of 78.8, an acid value of 8.0 and a hydroxyl value of 279.7.

The polyester prepared as described above was reacted with isophorone diisocyanate from the following charge:

| Ingredients | Parts by Weight (grams) |
| --- | --- |
| Polyester prepared as described above | 1799.8 |
| Isophorone diisocyanate | 699.9 |
| Dibutyltin dilaurate | 0.25 |
| Methyl isobutyl ketone | 1071 |

The polyester, isophorone diisocyanate and dibutyltin dilaurate were charged to a reaction vessel equipped for reflux and a nitrogen sparge. The reaction mixture was heated to 110° C. under a nitrogen blanket to initiate an exotherm. After the exotherm began to subside, the methyl isobutyl ketone was added and the reaction temperature maintained at about 110° C. until an IR spectrum indicated the disappearance of NCO groups. The reaction product had a solids content of 69.2 percent, an acid value of 2.9 and a hydroxyl value of 43.3.

EXAMPLE G

An acrylic polymer similar to that described above (Example D) was prepared with the exception that the solvent used for polymerization was a mixture of methyl amyl ketone and butanol (97.41/2.59 methyl amyl ketone/butanol weight ratio) used in place of the methyl amyl ketone of Example D. The acrylic polymer had a solids content of 67.5 percent and an acid value of 18.3.

EXAMPLE H

A blue pigment paste containing a water-dilutable polyurethane binder was prepared from the following mixture of ingredients:

| Ingredients | Parts by Weight (grams) |
| --- | --- |
| Aqueous Polyurethane Dispersion[1] | 650 |
| Monohexylether of ethylene glycol | 25 |
| Deionized water | 50 |
| Dimethylethanolamine | 2 |
| Phthalocyanine blue | 90 |
| FOAMKILL 639[2] | 1 |

[1]Aqueous polyurethane dispersion similar to that of Example C but prepared without TINUVIN 770.
[2]Hydrocarbon oil-containing inert diatomaceous earth obtained from Crucible Chemical Company.

The above ingredients were milled to a Hegman grind of 7½+.

EXAMPLE J

An aluminum pigment paste was prepared from the following ingredients:

| Ingredients | Parts by Weight (grams) |
| --- | --- |
| Aluminum pigment[1] | 280 |
| Monohexylether of ethylene glycol | 232 |
| Anti-gassing agent[2] | 18 |
| Aqueous Polyurethane Dispersion of Example H | 390 |

[1]65 percent by weight commercially available non-leafing aluminum flakes in hydrocarbon solvents.
[2]Amine phosphate available from Mobil Oil Company as VC3-419.

The ingredients were mixed in the order indicated at low shear with good agitation to form the pigment paste.

BASE COATS

EXAMPLE K

A basecoat composition containing a water-dilutable polyurethane binder was prepared from the following mixture of ingredients:

| Ingredients | Parts by Weight (grams) |
| --- | --- |
| Aluminum pigment[1] | 30.8 |
| Anti-gassing agent used in Example J | 2 |
| Monobutyl ether of diethylene glycol | 10 |
| Monohexyl ether of ethylene glycol | 10 |
| Aqueous Polyurethane Dispersion of Example A | 200 |
| CYMEL 325[2] | 25 |
| Monohexyl ether of ethylene glycol | 26 |
| Deionized water | 50 |
| Aqueous Polyurethane Dispersion of Example B | 60.6 |
| Deionized water | 74 |

[1]65 percent by weight commercially available non-leafing aluminum flakes in hydrocarbon solvents.
[2]Methylated melamine-formaldehyde condensate available from American Cyanamid Company.

The aluminum pigment, anti-gassing agent, monobutyl ether of diethylene glycol and the first portion of the monohexyl ether of ethylene glycol were charged to a steel can and mixed well with an overhead stirrer. The remaining ingredients were added to the can sequentially in the order listed with good mixing from the overhead stirrer to form the final paint composition which had a solids content of 25 percent and a No. 4 Ford cup viscosity of 14.4 seconds. The paint was homogeneous with the solid ingredients being well dispersed throughout the continuous aqueous phase.

EXAMPLE L

A basecoat composition containing a water-dilutable polyurethane binder was prepared from the following mixture of ingredients:

| Ingredients | Parts by Weight (grams) |
| --- | --- |
| Anti-gassing agent used in Example J | 2 |
| Monobutyl ether of diethylene glycol | 10 |
| Monohexyl ether of ethylene glycol | 10 |
| Aqueous Polyurethane Dispersion of Example B | 91 |
| Aluminum pigment used in Example K | 30.8 |
| Monohexyl ether of ethylene glycol | 13 |
| Deionized water | 30 |
| Aqueous Polyurethane Dispersion of Example B | 212 |
| Deionized water | 37 |

The anti-gassing agent, monobutyl ether of diethylene glycol, the first portions of the monohexyl ether of ethylene glycol and the water-dilutable polyurethane binder, and the aluminum pigment were charged to a one-pint can and well agitated with an overhead stirrer. The remaining ingredients were added sequentially in the order listed with good mixing from the overhead stirrer to form an aqueous dispersion. The dispersion was thinned with an additional 50 grams of deionized water to form the final paint composition which had a solids content of 25 percent.

EXAMPLE M

A blue metallic basecoating composition was prepared from the following mixture of ingredients:

| Ingredients | Parts by Weight (grams) |
| --- | --- |
| Blue Pigment Paste of Example H | 27.3 |
| Silver Pigment Paste of Example J | 5.1 |
| Aqueous Polyurethane Dispersion of Example C | 285 |
| Monohexylether of ethylene glycol | 24 |
| Surfactant[1] | 1 |

[1]25 percent by weight in monohexyl ether of ethylene glycol of a silicon surfactant available as L5310 from Union Carbide Corporation.

CLEAR COATS

EXAMPLE N

A two-package clear coat composition comprising an acrylic polyol and a polyester polyol in one package and a polyisocyanate in a second package was prepared from the following ingredients:

| Ingredients | Parts by Weight (grams) |
| --- | --- |
| U.V. light stabilizer[1] | 8 |
| Methyl amyl ketone | 20 |
| Acrylic polyol of Example D | 90 (0.0543 equivalents active hydrogen) |
| Polyester polyol of Example E | 14.2 (0.052 equivalents active hydrogen) |
| U.V. light stabilizer[2] | 2.5 |
| Surfactant[3] | 1 |

-continued

| Ingredients | Parts by Weight (grams) |
|---|---|
| Anti-cratering additive[4] | 1 |
| 1/1 ratio by weight mixture xylene/methyl isobutyl ketone | 28 |
| 2-Ethylhexanoic acid | 2 |
| Dibutyltin dilaurate[5] | 1 |

[1]25 percent by weight solution in xylene of a substituted benzotriazole, TINUVIN 328 available from Ceba Geigy Company.
[2]20 percent by weight solution in 1/1 ratio by weight xylene/methyl isobutyl ketone of hindered amine available from Ciba Geigy Company as TINUVIN 292.
[3]15 percent by weight in ethylene glycol monoacetate of a silicon available as BYK 300 from Mallinckrodt Chem. Produkte GmbH.
[4]Poly(2-ethylhexylacrylate) available from Monsanto Company as MULTIFLOW.
[5]1 percent solution in xylene.

The above ingredients were charged sequentially in the order listed to a steel can with good agitation to form the first package of a two-pack clear coat composition.

The second package comprised 26 grams (23.4 grams solids, 0.1238 equivalents) of a polyisocyanate which is the isocyanurate of hexamethylene diisocyanate available from Mobay as KL 52444. The two packages were kept in separate containers.

EXAMPLE O

A two-package clear coating composition similar to that of Example N was prepared but in which a polyurethane polyol was used instead of the mixed acrylic-polyester polyol mixture. The coating composition was prepared from the following mixture of ingredients:

| Ingredients | Parts by Weight (grams) |
|---|---|
| U.V. light absorber used in Example N | 6 |
| 1/1 ratio by weight mixture of xylene/methyl isobutyl ketone | 46 |
| Polyurethane polyol of Example F | 100 (0.10339 equivalent) |
| Surfactant used in Example M | 1 |
| U.V. light stabilizer used in Example N | 2 |
| Dibutyltin dilaurate used in Example N | 2 |
| 2-Ethylhexanoic acid | 2 |

The ingredients were charged in the order listed to a steel can with good agitation to form the first package of the two-package system.

The second package comprised 21.7 grams (19.6 grams solids, 0.1137 equivalents) of an isocyanurate of 1,6-hexamethylene diisocyanate available from Mobay Chemical Company as KL 52444.

EXAMPLE P

A one-package clear coat composition comprising an acrylic polyol and an aminoplast curing agent was prepared from the following mixture of ingredients:

| Ingredients | Parts by Weight (grams) |
|---|---|
| U.V. light absorber[1] | 2 |
| SOLVESSO 150[2] | 32 |
| Monohexyl ether of ethylene glycol | 9 |
| Aminoplast resin[3] | 46 |
| Acrylic polyol of Example G | 100 |
| U.V. light stabilizer[4] | 2 |
| Catalyst[5] | 1 |
| Anti-cratering additive used in Example N | 1 |

[1]Substituted benzotriazole available from Ciba Geigy as TINUVIN 328.
[2]Aromatic, aliphatic hydrocarbon blend available from Exxon Company.
[3]Butylated melamine-formaldehyde condensate available from Monsanto Company as MR 231.
[4]25 percent by weight hindered amine available from Ciba Geigy as TINUVIN 292 and 25 percent by weight dodecylbenzene sulfonic acid in isobutanol.
[5]20 percent by weight dodecylbenzene sulfonic acid in xylene.

The ingredients were charged to a one-pint steel can sequentially in the order indicated with good agitation to form the clear coating composition which had a package viscosity of 64 seconds as measured with a No. 4 Ford cup. The coating composition was thinned was additional monohexylether of ethylene glycol to a No. 4 Ford cup viscosity of 35 seconds and a solids content of 47.7 percent.

EXAMPLE Q

An aqueous-based clear coating composition was prepared from the following ingredients:

| Ingredients | Parts by Weight (grams) |
|---|---|
| Polyurethane Dispersion of Example C | 312.5 |
| Monohexylether of ethylene glycol | 25.0 |
| Surfactant used in Example M | 1 |

The ingredients were charged to a steel can sequentially in the order indicated with good agitation to form the clear coating composition.

EXAMPLES I-VI

The coating compositions described above were spray applied to steel panels with the pigment-containing compositions being applied first as a basecoat and the clear coating compositions being subsequently applied over the basecoat. The basecoats were spray applied in two coats with the first coat being flashed for one minute before application of the second basecoat. Both basecoats were then flashed for two minutes at 150° F. (66° C.) before the clear coating was applied. The basecoats had a thickness of about 0.2 to 0.4 mils.

The clear coats were also applied in two coats with a one-minute flash between coats. The clear coats had a thickness of about 1.8 to 2.2 mils. After the second clear coat was applied, the entire coating was flashed for 10 minutes at room temperature and then baked in an oven for 30 minutes at 250° F. (121° C.). The composite coatings had a thickness of about 2.0 to 2.6 mils. The composite coatings were evaluated for gloss, distinctness of image (DOI), hardness and solvent resistance. The results are reported in Table I below.

TABLE I

| | | Properties of Clear Over Color Coatings | | | | |
|---|---|---|---|---|---|---|
| Example Number | Basecoat Example | Clear Coat Example | 20° Gloss[1] | DOI[2] | Knoop Hardness Number[3] | Solvent Resistance[4] Xylene/Acetone |
| I | L | N | 86 | 90–94 | 5.1 | Poor/Poor |
| II | L | O | 84 | 85–90 | 2 | Good/Good |
| III | L | P | 88 | 83 | 5.8 | Good/Good |
| IV | K | N | 86 | 90–92 | 5.95 | Poor/Poor |

TABLE I-continued

| | | Properties of Clear Over Color Coatings | | | | |
|---|---|---|---|---|---|---|
| Example Number | Basecoat Example | Clear Coat Example | 20° Gloss[1] | DOI[2] | Knoop Hardness Number[3] | Solvent Resistance[4] Xylene/Acetone |
| V | K | O | 86 | 88–90 | 2 | Good/Good |
| VI | K | P | 88 | 75 | 5.35 | Good/Good |

[1]Measured with 20 degree gloss meter manufactured by Gardner Instrument Company.
[2]Determined on Dori-Gon Meter D 47-6 manufactured by Hunter Laboratories.
[3]Determined by ASTM E-384.
[4]Drop of solvent placed on the cured coating and allowed to stand for 15 seconds. The solvent was wiped off with a cloth and residual solvent permitted to evaporate at room temperature. The solvent area of the coating was then scratched with a fingernail. If the coating was removed, a poor evaluation was given; if the coating could not be removed, a good evaluation was given.

EXAMPLE VII

The water-base basecoat composition of Example C was spray applied to a thermoplastic polyurethane substrate available from Mobay Chemical Company as TEXIN 3202 and heated for 15 minutes at 120° F. (49° C.), followed by the spray application of the clear coat composition of Example Q. The composition coating was then heated for 15 minutes at 120° F. (49° C.). The coated substrate had a 20° gloss of 77 and a DOI of 95. Also, when the coated substrate was cooled to −20° F. (−29° C.) and bent around a ½-inch (1.13 cm) diameter mandrel with the coating side outwardly facing, the coating exhibited no breaks or cracks.

I claim:

1. A process for applying a composite coating to a substrate comprising:
   (1) applying to the surface of the substrate an aqueous-based film-forming composition containing color pigments and a water-dilutable polyurethane binder,
   (2) forming a basecoat on the surface of the substrate from the composition applied from step 1,
   (3) applying to said basecoat a film-forming composition,
   (4) forming a transparent topcoat from the composition applied in step 3 over the basecoat.

2. The process of claim 1 in which the polyurethane is formed by chain extending an NCO-prepolymer in aqueous medium with an active hydrogen-containing compound having at least two active hydrogen groups which are more reactive with NCO groups than water.

3. The process of claim 2 in which the polyurethane contains at least 8 percent by weight urethane moieties.

4. The process of claim 1 in which a free film of the polyurethane has a percent elongation of greater than 40 percent and a tensile strength greater than 2000 psi.

5. The process of claim 1 in which the polyurethane is a poly(ester-urethane).

6. The process of claim 5 in which the poly(ester-urethane) is a poly(ether-ester)urethane.

7. The process of claim 1 in which the basecoat composition contains an aminoplast.

8. The process of claim 1 in which the metallic pigment is aluminum flake.

9. The process of claim 1 in which the basecoat composition is applied by spraying.

10. The process of claim 1 in which the substrate comprises both metallic and elastomeric parts and the basecoat composition is applied to both parts.

11. The process of claim 1 in which the topcoat composition is a one-package system comprising an active hydrogen-containing polymer and an aminoplast.

12. The process of claim 11 in which the active hydrogen-containing polymer is an acrylic polymer.

13. The process of claim 11 in which the active hydrogen-containing polymer is a polyurethane.

14. The process of claim 1 in which the topcoat composition is a two-pack system comprising an active hydrogen-containing polymer and a polyisocyanate.

15. The process of claim 1 in which the active hydrogen-containing polymer is a polyurethane.

16. The process of claim 1 in which the topcoat composition is organic solvent based.

17. The process of claim 1 in which the topcoat composition is aqueous based.

18. The process of claim 16 in which the topcoat composition is sprayable at a resin solids content of at least 40 percent by weight.

19. A process for applying a composite coating to a substrate comprising both metallic and elastomeric parts, comprising:
   (1) spraying the substrate with an aqueous-based coating composition containing metallic pigments and a water-dilutable poly(ester-urethane) binder which is formed by chain extending an NCO-poly(ester-urethane) prepolymer in aqueous medium with an active hydrogen-containing compound having at least two active hydrogen groups which are more reactive with NCO groups than water;
   (2) forming a basecoat on the surface of the substrate from the composition applied from step 1;
   (3) applying to said basecoat a film-forming composition from a two-package organic solvent-based system comprising a polyurethane polyol and a polyisocyanate, said film-forming composition being sprayable at a resin solids content of at least 40 percent by weight;
   (4) forming a transparent topcoat from the composition applied from step 3.

20. The process of claim 19 in which the basecoat composition contains an aminoplast.

21. An article coated by the process of claim 1.

22. An article coated by the process of claim 19.

* * * * *